*(12)* United States Patent
Ramlall

*(10)* Patent No.: US 9,678,215 B2
*(45)* Date of Patent: Jun. 13, 2017

(54) CORRELATED GPS PSEUDORANGE ERROR ESTIMATION METHOD

(71) Applicant: The United States of America as represented by the Secretary of the Navy, Washington, DC (US)

(72) Inventor: Rohan Y. Ramlall, Brentwood, CA (US)

(73) Assignee: THE UNITED STATES OF AMERICA AS REPRESENTED BY THE SECRETARY OF THE NAVY, Washington, DC (US)

( * ) Notice: Subject to any disclaimer, the term of this patent is extended or adjusted under 35 U.S.C. 154(b) by 601 days.

(21) Appl. No.: 14/242,168

(22) Filed: Apr. 1, 2014

(65) Prior Publication Data

US 2015/0276934 A1    Oct. 1, 2015

(51) Int. Cl.
  *G01S 19/40*  (2010.01)
  *G01C 21/16*  (2006.01)
  *G01S 19/23*  (2010.01)
  *G01S 19/47*  (2010.01)
  *G01C 21/00*  (2006.01)

(52) U.S. Cl.
  CPC .......... *G01S 19/40* (2013.01); *G01C 21/165* (2013.01); *G01S 19/23* (2013.01); *G01S 19/47* (2013.01); *G01C 21/005* (2013.01)

(58) Field of Classification Search
  CPC . G01S 5/02; G01S 19/14; G01S 19/23; G01S 19/47; G01C 21/005; G01C 21/165
  See application file for complete search history.

(56) References Cited

U.S. PATENT DOCUMENTS

| | | | | |
|---|---|---|---|---|
| 6,167,347 | A * | 12/2000 | Lin ...................... | G01C 21/165 342/357.29 |
| 6,516,021 | B1 * | 2/2003 | Abbott .................... | G01S 19/49 342/108 |
| 2010/0097268 | A1 * | 4/2010 | Roh ........................ | G01S 19/47 342/357.3 |

(Continued)

OTHER PUBLICATIONS

Iqbal et al., http://gpsworld.com/innovation-filling-in-the-gaps-improving-navigation-continuity-using-parallel-cascade-identification/, Oct. 2011, GPS World, pp. 2-19.*

*Primary Examiner* — Gregory C Issing
*Assistant Examiner* — Daniel P Malley, Sr.
(74) *Attorney, Agent, or Firm* — SPAWAR Systems Center Pacific; Kyle Eppele; Ryan J. Friedl

(57) ABSTRACT

A method for predicting a GPS pseudorange error includes receiving a first plurality of pseudorange errors at a plurality of different times for a plurality of global positioning system (GPS) satellites. The method also includes creating, using a processor, a first matrix. Each element of the first matrix is determined using a portion of the first plurality of pseudorange errors. The method yet further includes creating, using the processor, a second matrix that includes at least a portion of the first plurality of pseudorange errors. A size of the second matrix is determined by comparing each element of the first matrix to a predetermined threshold. The method still further includes predicting, using the processor, a second plurality of pseudorange errors for the plurality of GPS satellites using the first plurality of pseudorange errors and the second matrix.

8 Claims, 3 Drawing Sheets

(56) References Cited

U.S. PATENT DOCUMENTS

2010/0109949 A1* 5/2010 Garmonov .............. G01S 19/47
701/472
2011/0169689 A1* 7/2011 Wang ................... G01C 21/165
342/357.3

* cited by examiner

CORRELATED GPS PSEUDORANGE ERROR ESTIMATION METHOD

FEDERALLY-SPONSORED RESEARCH AND DEVELOPMENT

The Correlated GPS Pseudorange Error Estimation Method is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-5118; email ssc_pac_T2@navy.mil; reference Navy Case Number 102027.

BACKGROUND

The purpose of a navigation system is to provide the user with an estimate of their time, position, velocity, and orientation. Global Navigation Satellite Systems (GNSS), like Global Positioning Systems (GPS), are designed to assist the user in estimating those quantities. However, GNSS require line of sight from the satellite to the user to provide reliable estimates. Therefore, in order to increase the robustness of the navigation system, GNSS receivers are integrated with other navigation sensors.

The conventional method is to integrate inertial navigation systems (INS) with GNSS receivers. The inertial navigation system provides the user with specific force measurements (used to estimate acceleration) and rotation rates (used to estimate position, velocity, and orientation) at a higher data rate than GNSS. However, INS suffer from errors that grow with time and require regular updates from GNSS to prevent the error growth. In a loose configuration, the INS and GNSS receiver act as independent navigation systems. Each systems' position, velocity, and orientation are filtered together to provide the user with time, position, velocity, and orientation. In a tight configuration, the INS and GNSS receiver are no longer independent. The INS provides specific force and rotation rate measurements and the GNSS provides pseudorange and pseudorange rates. These measurements are filtered together to provide the user with time, position, velocity, and orientation.

Tightly integrated GPS/INS systems typically model the errors in the pseudorange measurements as white noise or first order Gauss-Markov processes. Some approaches model the pseudorange errors as autoregressive processes. The disadvantage in these approaches is that the pseudorange errors are assumed to be uncorrelated with each other. However, since the GNSS signals travel from space to the user, environmental and/or geometrical factors can lead to time correlation between different pseudorange errors, which these conventional approaches do not account for. A need exists for a method to exploit the time correlation between different pseudorange errors, thus producing a better position estimate than the conventional methods.

DETAILED DESCRIPTION OF SOME EMBODIMENTS

Figure 1:
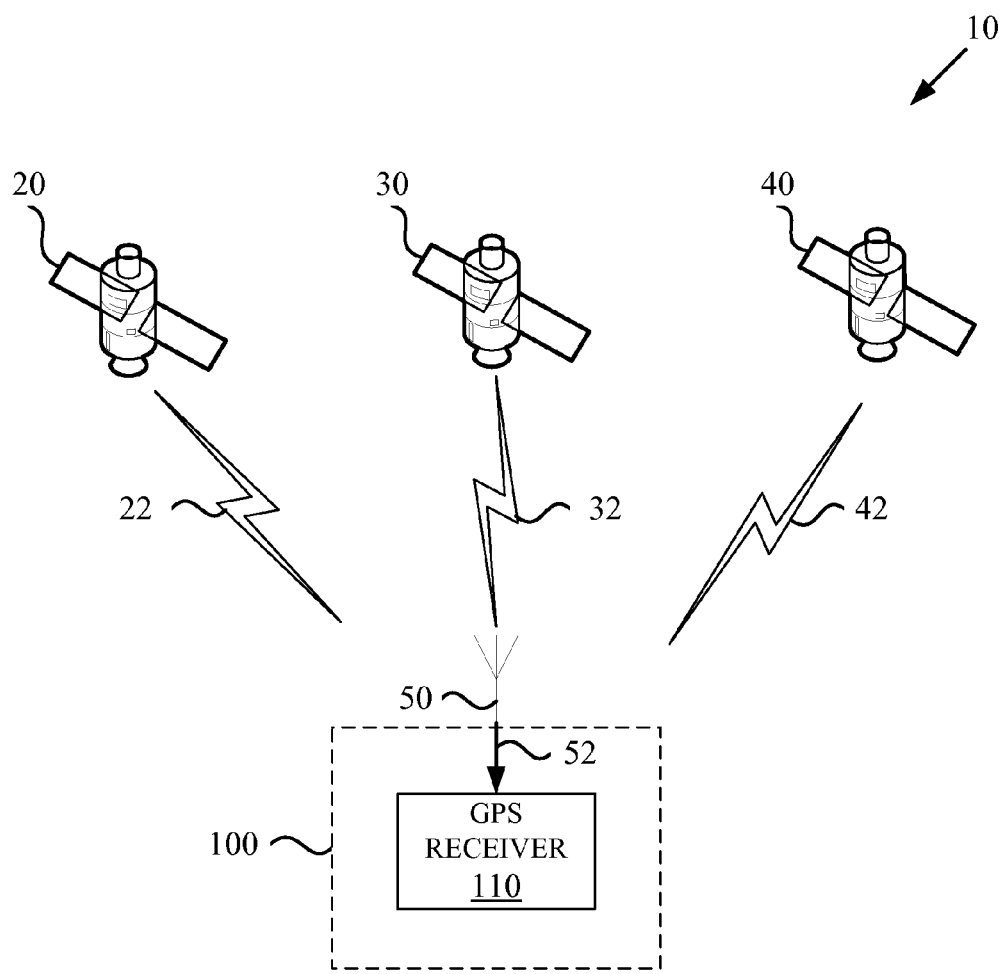
FIG. 1 shows a block diagram of an embodiment of the operational concept of a system in accordance with the Correlated GPS Pseudorange Error Estimation Method.

In some embodiments, the subject matter disclosed herein involves the use of an extended Kalman filter (EKF) in a tightly integrated GPS/INS architecture. The EKF is defined by its state vector, time update, and measurement update. The state vector is the parameters that are desired to be estimated. The time update is how the state vector evolves with time using a dynamic model of the system and is referred to as the a priori state estimate. The measurement update is used to optimally combine the current measurement with the a priori state prediction, thus improving the state estimate.

In the tightly integrated GPS/INS architecture, the state vector is composed of the following 17+n parameters: position error (3×1 vector in North-East-Down coordinates), velocity error (3×1 vector in North-East-Down coordinates), orientation error (3×1 vector in radians using the 3-2-1 aerospace Euler angles), accelerometer bias error (3×1 vector in m/s$^2$), gyroscope bias error (3×1 vector in rad/s), clock bias error (1×1 scalar in m), clock drift error (1×1 scalar in m/s), pseudorange error (n×1 vector in meters).

In the tightly integrated GPS/INS architecture, the time update consists of a time update for the accelerometer and gyroscope, clock, and pseudorange error. The pseudorange error's time update is described below.

The model used for the $i^{th}$ pseudorange error $\delta\rho_i$ at time k is given by $$(\delta\rho_i)_k = \sum_{j=1}^{n} \alpha_{i,j}(\delta\rho_j)_{k-1} + v_k \qquad \text{(Eq. 1)}$$

where $v_k$ is white noise, n is the number of distinct satellite pseudorange errors, and $\alpha_{i,j}$ is a parameter relating the contribution of $(\delta\rho_j)_{k-1}$ to $(\delta\rho_i)_k$. The parameter $\alpha_{i,j}$ is determined as set forth below.

First, an n×n matrix C is formed where element (i,j) is given by $$C_{ij} = (A^T A)^{-1} A^T \vec{b} \qquad \text{(Eq. 2)}$$

where A is an N×1 vector of satellite j's N previous pseudorange errors (not including the latest pseudorange error) and b is an N×1 vector of satellite i's N previous pseudorange errors (including the latest pseudorange error). In some embodiments, initially, N pseudorange errors are collected for each satellite. This can be done by keeping the GPS receiver stationary at a known location for N seconds, and accounting for errors sources such as the satellite clock offset, modeled tropospheric delay, and receiver hardware propagation delay. As an example, N=20.

Next, for i=1 to n, D is a N×f matrix where f is the number of pseudorange errors that demonstrate a "correlation" with the ith pseudorange error. In this context, "correlation" means either $C_{ij}>0.6$ or $C_{ij}<-0.6$. Also, $C_{ii}$ is included as "correlated" regardless of its value. Each column of D is the corresponding vector A from $C_{ij}$ in (Eq. 2). Further, b is an N×1 vector of satellite i's N previous pseudorange errors (including the latest pseudorange error). Then, the parameters $\alpha_{i,j}$ are given by $$\alpha_{ij} = (D^T D)^{-1} D^T \vec{b}. \qquad \text{(Eq. 3)}$$

The $i^{th}$ pseudorange error $\delta\rho_i$ may then be predicted at time k using the equation $$(\delta\rho_i)_k = \sum_{j=1}^{n} \alpha_{i,j}(\delta\rho_j)_{k-1}. \quad \text{(Eq. 4)}$$

In the tightly integrated GPS/INS architecture, the measurement update consists of a measurement update for the position, velocity, orientation, clock errors, and pseudorange error. For the pseudorange error, instead of subtracting the conventional state error correction (equal to the product of the Kalman gain and measurement innovation) from the a priori state prediction, only the measurement innovation is subtracted from the a priori state prediction. This step may require that the INS used be a tactical or navigation grade INS and the clock used be of high quality (i.e., low phase noise and high frequency stability) like that of a miniature or chip-scale atomic clock.

Figure 2:
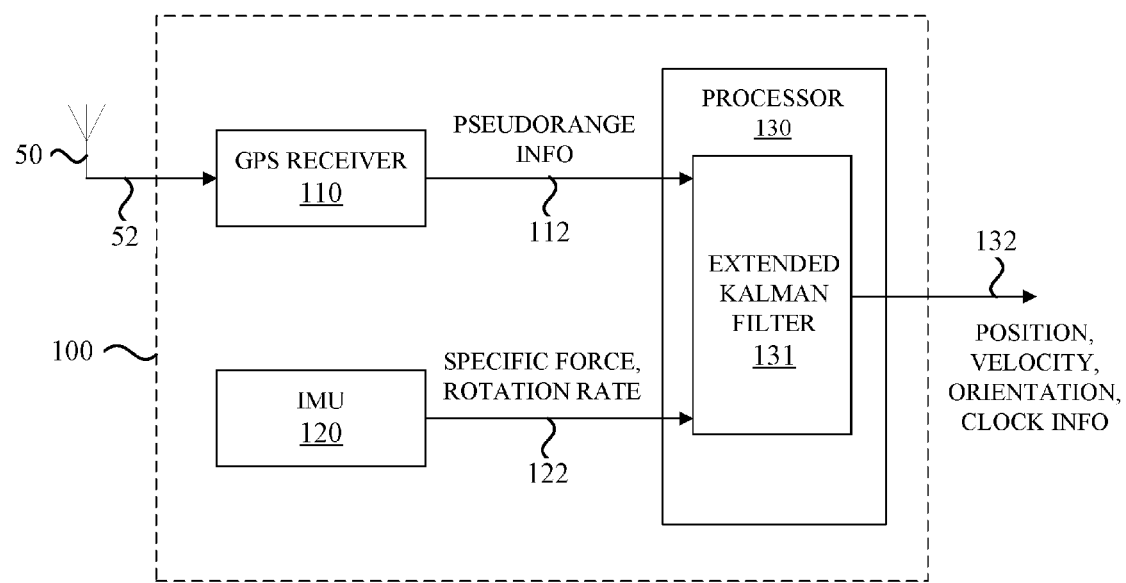
FIG. 2 shows a block diagram of an embodiment of an integrated GPS/INS system in accordance with the Correlated GPS Pseudorange Error Estimation Method.

FIG. 1 shows a block diagram 10 of an embodiment of the operational concept of a system in accordance with the Correlated GPS Pseudorange Error Estimation Method. Satellites 20, 30, and 40 form a GPS communications network with system 100. Although three satellites are shown, system 100 may include more or less satellites, so long as there is at least one. As an example, system 100 is an integrated GPS/INS system such as shown in FIG. 2. Satellite signals 22, 32, and 42 are received via antenna 50 from respective satellites 20, 30, and 40. The incoming signal 52 from antenna 50 is received by GPS receiver 110 within system 100.

FIG. 2 shows a block diagram of an embodiment of a system 100 that may be used to implement the Correlated GPS Pseudorange Error Estimation Method. As shown, system 100 is configured as a tightly integrated GPS/INS system. However, it should be recognized by one having ordinary skill in the art that the method disclosed herein is not limited to such a GPS/INS system, but may be applied to other GPS systems.

System 100 includes a GPS receiver 110, inertial measurement unit (IMU) 120, and a processor 130 having an EKF 131 implemented therein. Incoming signal 52 from antenna 50 is received by GPS receiver 110, which processes the signal and provides a pseudorange information signal 112 to EKF 131. As an example, EKF 131 may be implemented via the appropriate software in processor 130, which is separate from GPS receiver 110. IMU 120 separately provides a specific force and rotation rate signal 122 to EKF 131. EKF 131 uses the information from signals 112 and 122 to produce a signal 132 containing position, orientation, velocity, and clock information.

Figure 3:
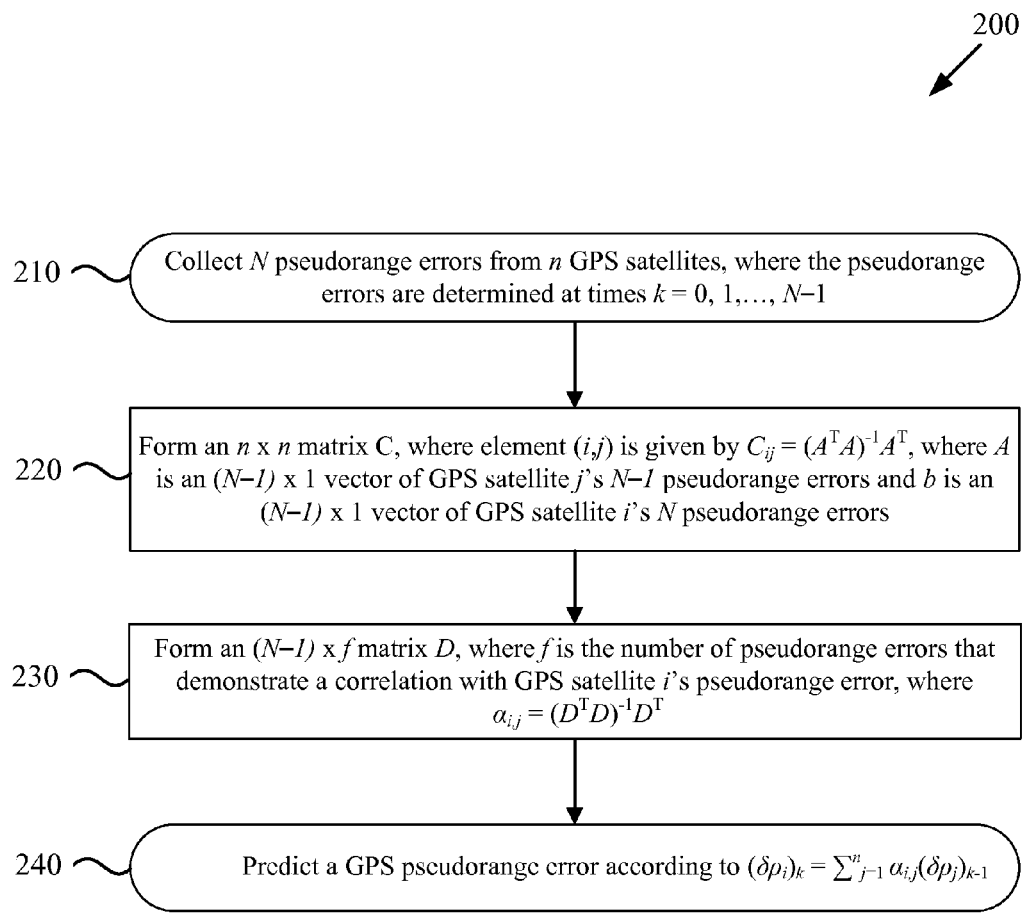
FIG. 3 shows a flowchart of an embodiment of a method in accordance with the Correlated GPS Pseudorange Error Estimation Method.

FIG. 3 shows a flowchart of an embodiment of a method 200 in accordance with the Correlated GPS Pseudorange Error Estimation Method. As an example, method 200 may be performed by system 100 as shown in FIGS. 1 and 2, and will be discussed with reference thereto. Also, while FIG. 2 shows one embodiment of method 200 to include steps 210-240, other embodiments of method 200 may contain fewer or more steps. Further, while in some embodiments the steps of method 200 may be performed as shown in FIG. 2, in other embodiments the steps may be performed in a different order, or certain steps may occur simultaneously with one or more other steps. Additionally, in some embodiments the steps of method 200 may be performed by EKF 130, such as during the time update processing phase.

Method 200 may begin with step 210, which involves collecting, via EKF 130, N pseudorange errors for n GPS satellites 20, 30, and 40, where the pseudorange errors are determined at times k=0, 1, . . . , N−1. Step 220 involves forming an n×n matrix C, where element (i,j) is given by $C_{ij}=(A^TA)^{-1}A^T\vec{b}$, where A is an (N−1)×1 vector of GPS satellite j's N−1 pseudorange errors (k=0, 1, . . . , N−2) and b is an (N−1)×1 vector of GPS satellite i's N pseudorange errors (k=1, 1, . . . , N−1).

Step 230 involves, for i=1 to n, forming an (N−1)×f matrix D, where f is the number of pseudorange errors that demonstrate a correlation with GPS satellite i's pseudorange error, where column j of D is an (N−1)×1 vector of GPS satellite j's N−1 pseudorange errors (k=0, 1, . . . , N−2). In some embodiments, GPS satellite j's pseudorange error is defined to be correlated with GPS satellite i's pseudorange error if $C_{ij}>0.6$. In some embodiments, GPS satellite j's pseudorange error is defined to be correlated with GPS satellite i's pseudorange error if $C_{ij}<-0.6$ Method 200 may then proceed to step 240, which involves predicting a GPS pseudorange error according to the equation $(\delta\rho_i)_k=\sum_{j=1}^{n}\alpha_{i,j}(\delta\rho_j)_{k-1}$, where $(\delta\rho_i)_k$ is a predicted pseudorange error from GPS satellite i at time k, $(\delta\rho_j)_{k-1}$ is a pseudorange error of a signal measured from GPS satellite j at time k−1, and $\alpha_{i,j}$ is a parameter relating the contribution of $(\delta\rho_j)_{k-1}$ to $(\delta\rho_i)_k$, where the parameter $\alpha_{i,j}=(D^TD)^{-1}D^T\vec{b}$. $(\delta\rho_i)_k$ serves as the a priori state estimate of the pseudorange error in the time update phase of the EKF 130.

While method 200 has been discussed with reference to GNSS, it is not limited thereto. Method 200 may be applied to any radio frequency ranging signal or other ranging signals where it is conceivable that environmental and/or geometrical factors may lead to time correlation between different ranging measurements.

Method 200 may be implemented as a series of modules, either functioning alone or in concert, with physical electronic and computer hardware devices. Method 200 may be computer-implemented as a program product comprising a plurality of such modules, which may be displayed for a user.

Various storage media, such as magnetic computer disks, optical disks, and electronic memories, as well as non-transitory computer-readable storage media and computer program products, can be prepared that can contain information that can direct a device, such as a micro-controller, to implement the above-described systems and/or methods. Once an appropriate device has access to the information and programs contained on the storage media, the storage media can provide the information and programs to the device, enabling the device to perform the above-described systems and/or methods.

For example, if a computer disk containing appropriate materials, such as a source file, an object file, or an executable file, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods, and coordinate the functions of the individual systems and/or methods.

Simulation Results

In the results shown below in Tables 1 and 2, 8 minutes of GPS pseudorange errors were simulated for n=6 GPS satellites (PRN #s 1, 3, 6, 9, 17, 21) using an advanced global navigation simulator. The value N in the tables below corresponds to N pseudorange errors for n GPS satellites as discussed above. The entries in Table 1 are the prediction error results defined to be the average predicted pseudorange error according to the Correlated GPS Pseudorange Error Estimation Method minus the true pseudorange error. The entries in Table 2 are the average prediction error results defined to be the predicted pseudorange error using a $1^{st}$ order autoregressive model minus the true pseudorange error.

Comparing Tables 1 and 2, it is evident that the Correlated GPS Pseudorange Error Estimation Method disclosed herein performs better (i.e. smaller error) than the $1^{st}$ order autoregressive model for pseudorandom noise codes PRNs 3, 6, and 17 for each of N=10, 15, and 20, while the method disclosed herein performs the same for PRNs 1 and 9 for each of N=10, 15, and 20. For PRN 21, the method disclosed herein performs slightly worse for N=10, while performing better for N=15 and 20.

TABLE 1

| N  | PRN 1  | PRN 3  | PRN 6   | PRN 9  | PRN 17  | PRN 21  |
|----|--------|--------|---------|--------|---------|---------|
| 10 | 0.0437 | 0.0079 | −0.0043 | 0.0228 | −0.0017 | −0.0585 |
| 15 | 0.0490 | 0.0163 | −0.0034 | 0.0142 | −0.0070 | −0.0108 |
| 20 | 0.0419 | 0.0144 | −0.0028 | 0.0274 | 0.0080  | −0.0057 |

TABLE 2

| N  | PRN 1  | PRN 3  | PRN 6   | PRN 9  | PRN 17 | PRN 21  |
|----|--------|--------|---------|--------|--------|---------|
| 10 | 0.0437 | 0.0364 | −0.0409 | 0.0228 | 0.0354 | −0.0527 |
| 15 | 0.0490 | 0.0335 | −0.0348 | 0.0142 | 0.0183 | −0.0656 |
| 20 | 0.0419 | 0.0295 | −0.0347 | 0.0274 | 0.0366 | −0.0586 |

In the results shown below in Table 3, 8 minutes of navigation grade IMU data and GPS pseudorange errors were simulated for n=6 GPS satellites (PRN #s 1, 3, 6, 9, 17, 21) using an advanced global navigation simulator. The data was filtered using an EKF 130 and N=20. The entries in column 2 of Table 3 are the sum of the mean squared error (MSE) estimation results using a $1^{st}$ order autoregressive model to predict the pseudorange errors. The entries in column 3 of Table 3 are the sum of the MSE estimation results for the Correlated GPS Pseudorange Error Estimation Method to predict the pseudorange errors. It is evident that the Correlated GPS Pseudorange Error Estimation Method disclosed herein performs better (i.e. smaller error) than the $1^{st}$ order autoregressive model for the Earth-Centered Earth-Fixed (ECEF) position coordinate estimates ($y_{ECEF}$, $z_{ECEF}$) and clock bias estimate and performs slightly worse for the $x_{ECEF}$ estimate.

TABLE 3

| Estimated Parameter | Sum of MSE using $1^{st}$ order autoregressive model (in meters$^2$) | Sum of MSE using Correlated GPS Pseudorange Error Estimation Method (in meters$^2$) |
|---|---|---|
| $x_{ECEF}$ | 520.4 | 523.7 |
| $y_{ECEF}$ | 698.7 | 255.5 |
| $z_{ECEF}$ | 638.9 | 177.4 |
| Clock bias | 219.8 | 45.2 |

Many modifications and variations of the Correlated GPS Pseudorange Error Estimation Method are possible in light of the above description. Within the scope of the appended claims, the embodiments of the systems described herein may be practiced otherwise than as specifically described. The scope of the claims is not limited to the implementations and the embodiments disclosed herein, but extends to other implementations and embodiments as may be contemplated by those having ordinary skill in the art.

I claim:

1. A method comprising the steps of:
receiving, at an extended Kalman filter (EKF) implemented within a processor connected to a global positioning system (GPS) receiver, a first plurality of pseudorange errors at a plurality of different times for a plurality of GPS satellites in communication with the GPS receiver;
creating, utilizing the EKF, a first matrix, where each element of the first matrix is determined utilizing a portion of the first plurality of pseudorange errors;
creating, utilizing the EKF, a second matrix that includes at least a portion of the first plurality of pseudorange errors, where a size of the second matrix is determined by comparing each element of the first matrix to a predetermined threshold; and
predicting, utilizing the EKF, a second plurality of pseudorange errors for the plurality of GPS satellites, utilizing the first plurality of pseudorange errors and the second matrix;
wherein the second plurality of pseudorange errors are predicted according to the equation $(\delta\rho_i)k = \Sigma_{j=1}^n \alpha i,j (\delta\rho_j)_{k-1}$, wherein $(\delta\rho_i)k$ is one of the second plurality of pseudorange errors from a second GPS satellite i at time k, and $(\delta\rho_j)_{k-1}$ is one of the first plurality of pseudorange errors from a first GPS satellite j at time k−1, and $\alpha_{i,j}$ is a parameter derived from the second matrix that is based on a correlation of the first plurality of pseudorange errors $(\delta\rho_j)_{k-1}$ from the first GPS satellite j and the second plurality of pseudorange errors $(\delta\rho_i)k$ from the second GPS satellite i; and
using the second plurality of pseudorange errors to generate a corrected pseudorange error to determine a corrected position of the GPS receiver.

2. The method of claim 1, wherein $\alpha_{i,j}$ is determined by the steps of:
identifying from the first plurality of pseudorange errors N pseudorange errors for n GPS satellites where the N pseudorange errors are determined at times k=0, 1, ..., N−1;
forming, utilizing the EKF, the first matrix, which includes an n×n matrix C, where element (i,j) is given by $C_{i,j} = (A^T A)^{-1} A^T \vec{b}$, where A is an (N−1)×1 vector of GPS satellite j's N−1 pseudorange errors (k=0, 1, ..., N−2) and b is an (N−1)×1 vector of GPS satellite i's N pseudorange errors (k=1, 1, ..., N−1); and
for i=1 to n, forming, utilizing the EKF, the second matrix, which includes an (N−1)×f matrix D, where f is the number of pseudorange errors that demonstrate a correlation with GPS satellite i's pseudorange error, where column j of D is an (N−1)×1 vector of GPS satellite j's N−1 pseudorange errors (k=0, 1, ..., N−2);
where $\alpha_{i,j} = (D^T D)^{-1} D^T \vec{b}$.

3. The method of claim 2, wherein comparing each element of the first matrix to the predetermined threshold includes determining, utilizing the EKF, that GPS satellite j's pseudorange error is correlated with GPS satellite i's pseudorange error when $C_{i,j} > 0.6$.

4. The method of claim 2, wherein comparing each element of the first matrix to the predetermined threshold includes determining, utilizing the EKF, that GPS satellite j's pseudorange error is correlated with GPS satellite i's pseudorange error when $C_{i,j} < -0.6$.

5. A system comprising:
a processor having an Extended Kalman Filter implemented therein, wherein the processor is connected to a global positioning system (GPS) receiver, the processor configured to perform the steps of:
receiving a first plurality of pseudorange errors at a plurality of different times for a plurality of global positioning system (GPS) satellites;
creating a first matrix, where each element of the first matrix is determined utilizing a portion of the first plurality of pseudorange errors;
creating a second matrix that includes at least a portion of the first plurality of pseudorange errors, where a size of the second matrix is determined by comparing each element of the first matrix to a predetermined threshold; and
predicting a second plurality of GPS pseudorange errors for the plurality of GPS satellites, utilizing the first plurality of pseudorange errors and the second matrix, wherein the second plurality of pseudorange errors are predicted according to the equation $(\delta\rho_i)k = \sum_{j=1}^{n} \alpha_{i,j} (\delta\rho_j)_{k-1}$, wherein $(\delta\rho_i)k$ is one of the second plurality of pseudorange errors from a second GPS satellite i at time k, and $(\delta\rho_j)_{k-1}$, is one of the first plurality of pseudorange errors from a first GPS satellite j at time k−1, and $\alpha_{i,j}$ is a parameter derived from the second matrix that is based on a correlation of the first plurality of pseudorange errors $(\delta\rho_j)_{k-1}$ from the first GPS satellite j and the second plurality of pseudorange errors $(\delta\rho_i)k$ from the second GPS satellite i; and
using the second plurality of pseudorange errors to generate a corrected pseudorange error to determine a corrected position of the GPS receiver.

6. The system of claim 5, wherein $\alpha_{i,j}$ is determined by the steps of:
identifying from the first plurality of pseudorange errors N pseudorange errors for n GPS satellites where the N pseudorange errors are determined at times k=0, 1, ..., N−1;
forming, utilizing processor, the first matrix, which includes an n×n matrix C, where element (i,j) is given by $C_{ij} = (A^T A)^{-1} A^T \vec{b}$, where A is an (N−1)×1 vector of GPS satellite j's N−1 pseudorange errors (k=0, 1, ..., N−2) and b is an (N−1)×1 vector of GPS satellite i's N pseudorange errors (k=1, 1, ..., N−1); and
for i=1 to n, forming, utilizing processor, the second matrix, which includes an (N−1)×f matrix D, where f is the number of pseudorange errors that demonstrate a correlation with GPS satellite i's pseudorange error, where column j of D is an (N−1)×1 vector of GPS satellite j's N−1 pseudorange errors (k=0, 1, ..., N−2), where $\alpha_{i,j} = (D^T D)^{-1} D^T \vec{b}$.

7. The system of claim 6, wherein comparing each element of the first matrix to the predetermined threshold includes determining, utilizing processor, that GPS satellite j's pseudorange error is correlated with GPS satellite i's pseudorange error when $C_{ij} > 0.6$.

8. The system of claim 6, wherein comparing each element of the first matrix to the predetermined threshold includes determining, utilizing processor, that GPS satellite j's pseudorange error is correlated with GPS satellite i's pseudorange error when $C_{ij} < -0.6$.

* * * * *